Jan. 6, 1925.
M. M. SWAIN
1,521,976
PEDAL EXTENSION
Filed Feb. 1, 1924
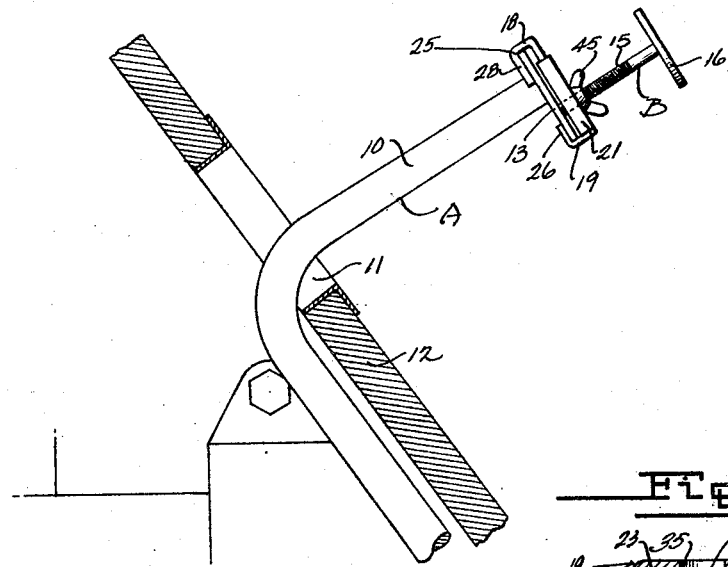
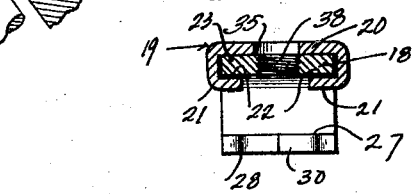
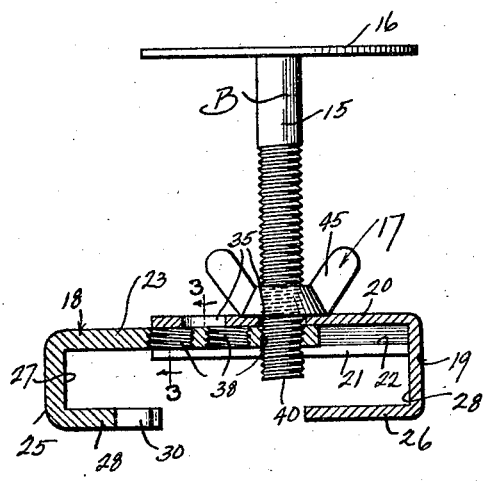
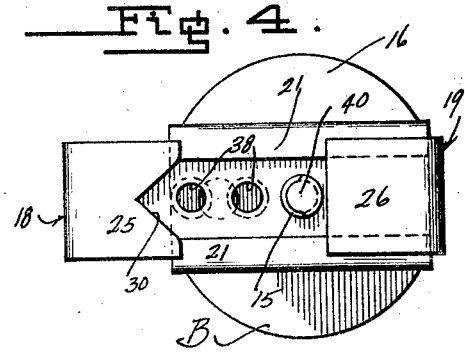
Inventor
Mack M. Swain Patented Jan. 6, 1925.

1,521,976

UNITED STATES PATENT OFFICE.

MACK M. SWAIN, OF LOS ANGELES, CALIFORNIA, ASSIGNOR OF FORTY PER CENT TO CHARLES A. PLACE, OF LOS ANGELES, CALIFORNIA.

PEDAL EXTENSION.

Application filed February 1, 1924. Serial No. 689,955.

*To all whom it may concern:*

Be it known that I, MACK M. SWAIN, a citizen of the United States, residing at Los Angeles, in the county of Los Angeles and State of California, have invented certain new and useful Improvements in a Pedal Extension, of which the following is a specification.

This invention relates to improvements in pedals.

The primary object of this invention is the provision of a novel, simple, and easily attachable type of pedal extension which is adapted to be used upon ordinary operating pedals so that short people, persons with a short leg, or persons of immature growth may operate the pedals in a comfortable manner.

A further object of this invention is the provision of a pedal extension which is primarily adapted for use in connection with the pedals of automotive vehicles, being of such nature that the same may be easily applied thereto for pedal operation by persons who cannot otherwise operate the pedal.

A further object of this invention is the provision of a novel adjustable type of pedal extension which may be attached to pedals of various sizes and shapes without altering the same, or providing various sizes of the same.

Other objects and advantages of this invention will be apparent during the course of the following detailed description.

In the accompanying drawing, forming a part of this specification, and wherein similar reference characters designate corresponding parts throughout the several views, Figure 1 is a side elevation of a pedal, showing the location of the same with respect to the conventional floor or toe-board of an automotive vehicle, and furthermore showing the improved pedal extension attached thereto.

Figure 2 is a cross sectional view taken through important clamping details of the improved pedal extension, showing the co-operating details of this invention.

Figure 3 is a cross sectional view taken substantially on the line 3—3 of Figure 2.

Figure 4 is a bottom plan view of the improved pedal extension.

In the accompanying drawing, wherein for the purpose of illustration is shown but the preferred embodiment of this invention, the letter A may generally designate any type of pedal upon which the improved extension B is to be used and rigidly clamped thereto so that classes of persons who otherwise would not be able to operate the pedal A may with the aid of the extension B conveniently and comfortably operate the pedal A to secure the desired effect.

The pedal A may be of any approved type, and preferably includes the supporting post or shank portion 10 which extends through a suitable slot 11 in the floor or toe-board construction 12 of an automotive vehicle, and which upon its free end supports the ordinary foot plate 13. This foot plate varies in sizes with different pedals, and hence it is an object of the invention to adapt the improved extension B to any pedal plate 13.

The improved extension B preferably includes a stem portion 15; pedal plate or foot plate 16; and means 17 adjustable on the stem 15 to clamp the improved pedal extension to the pedal A.

The extension pedal plate is preferably flat, although the same may be of any approved shape, and it has rigidly attached thereto the supporting stem 15, which is screw threaded from a point adjacent the plate 16 to the extreme opposite end.

The means 17 by which the pedal post 15 is adjustably clamped in a secured position upon the conventional pedal 13, consists of a pair of clamping jaws or members 18 and 19 which are preferably formed of stamped sheet metal. The member 19 is preferably J-shaped in formation, including the plate body 20 which has the lateral inturned flanges 21 at the sides thereof to provide side grooves 22 in facing relation which are adapted to slidably receive therein the side portions of the plate body 23 of the J-shaped clamping member 18. The members 18 and 19 at their remote ends are provided with the hook portions 25 and 26 respectively which provide pockets 27 and 28 respectively, adapted to receive therein edge portions of the foot rest or plate 13 of the pedal A. The edge of the lowermost flange 28 of the hook portion 25, and which lies beneath the pedal plate 13 is preferably provided with a V-shaped recess 30 therein adapted to receive the pedal post 10 as the means of stably locating the clamping means against lateral movement with respect to the pedal A when clamped thereto.

The plate body 20 of the clamping portion 19 is preferably provided with a plurality of openings 35 therethrough which slidably receive the screw threaded stem or post 15 therethrough. The plate portion 23 of the J-shaped member 18, however, is preferably provided with a plurality of screw threaded openings 38 therethrough adapted to adjustably receive the post or stem 15 therein.

In operation, the body portion 23 of the J-shaped clamped portion 18 is slipped within the grooves 22 of the J-shaped member 19 and the portions 18 and 19 are then laterally slipped over the pedal foot rest plate 13 and so that the flange portions of the hooks 25 and 26 lie beneath the pedal plate 13. The flange 28 is uppermost upon the pedal A and receives in the recess 30 the shank portion 10 of said pedal substantially in the relation shown in Figure 1 of the drawing. The members 18 and 19 are then slid into their most collapsed relation upon the foot pedal plate 13, and until one of the openings 35 aligns with a screw threaded opening 38. The screw threaded stem 15 is then inserted in these aligning openings 35 and 38, and is adjusted until the end surface 40 of this stem engages the top surface of the pedal plate 13, and is continued in its adjustment until the flange portions of the hooks 25 and 28 which are below the plate 13 snugly engage the lower surface of the plate 13. The clamping jaws 18 and 19 are then secured in a clamped relation upon the pedal plate 13, and a wing nut 45 is preferably provided upon the screw threaded stem 15 which may be adjusted downwardly thereover into a clamping engagement with the upper surface of the plate body portion 20. This locks the screw threaded stem 15 into the desired clamped relation with respect to the pedal and pedal extension.

From the foregoing description of this invention it is apparent that a pedal extension has been provided which is of a relatively simple character, and which may be economically produced. It may be clamped in a locked and stable relation upon the pedal plate of a conventional order, and the improved extension is provided with an adjustable clamping means whereby it may adapt itself to a particular size of pedal plate.

Various changes in the shape, size, and arrangement of parts may be made to the form of the invention herein shown and described, without departing from the spirit of this invention or the scope of the claims.

I claim:

1. A pedal extension comprising a pedal plate, a screw threaded stem fixed on the plate, a pedal clamping member provided with a screw threaded opening therethrough for receiving said screw threaded stem, and a nut adjustable on the screw threaded stem between said pedal clamping member and said pedal plate.

2. In combination with a conventional pedal including a foot rest plate, of a pedal extension including a pedal plate, a screw threaded stem secured to said pedal plate, and a clamping plate having flanges overturned thereon adapted to receive therein the foot rest plate and having a screw threaded opening therein for receiving in adjustable manner the screw threaded stem of said pedal extension therethrough, said screw threaded stem adapted to abut said foot rest plate to clamp the flanges of said pedal extension plate beneath the pedal foot rest.

3. In a device of the class described the combination of a pair of substantially J-shaped clamping portions one of which has smooth openings therein and the other of which is provided with screw threaded openings therein, means slidably connecting the plates together whereby the openings thereof may be placed in alignment so that the ends of the J-shaped portions may be moved toward or away from each other, a screw threaded post adapted for extension through the aligning openings and for a threaded adjustment in a screw threaded opening, and a pedal plate carried by said post opposite to said J-shaped clamping portions.

4. In a device of the class described the combination of a pair of substantially J-shaped clamping portions one of which has smooth openings therein and the other of which is provided with screw threaded openings therein, means slidably connecting the plates together whereby the openings thereof may be placed in alignment so that the ends of the J-shaped portions may be moved toward or away from each other, a screw threaded post adapted for extension through the aligning openings and for a threaded adjustment in a screw threaded opening, a pedal plate carried by said post opposite to said J-shaped clamping portions, and a nut adjustable on said screw threaded stem between said J-shaped clamped portions and said pedal plate.

5. In a pedal extension of the class described a pair of substantially J-shaped clamping portions each having an opening therein, said clamping portions adapted to be relatively moved to place the openings in aligning relation, a post having a foot rest plate on an end thereof and at its opposite end adapted to extend through the aligning openings of said clamping portion, and means for securing the post in such relation in said openings to hold the clamping portions in a fixed assembled relation.

6. In a device of the class described a pair of clamping portions each including a main body of elongated formation at one end thereof having a J-shaped retaining flange, one of said portions at the lateral edges thereof providing underturned retaining flanges adapted to slidably receive the body portion of the other clamping portion, the body portion of the clamping portion having the lateral flanges being provided with a series of openings therealong, and the body portion of the other clamping portion having a series of screw threaded openings therein adapted to be selectively placed in alignment with the openings of the body of the clamping portion beneath which it is placed, a screw threaded supporting post adapted to extend through the aligning openings of said clamping portion in threaded engagement with the threaded opening of one of said clamping portions, a foot rest plate on the upper end of said post, and a nut in threaded engagement with said post between the foot rest plate and the uppermost clamping portion adapted to engage the latter for locking the clamping portions in a definite fixed relation.

MACK M. SWAIN.